(12) United States Patent
Felberg et al.

(10) Patent No.: US 11,400,329 B2
(45) Date of Patent: Aug. 2, 2022

(54) CONNECTION ADAPTER FOR A CONTAINER FOR A FIRE-EXTINGUISHING AGENT PERTAINING TO A FIRE-EXTINGUISHING SYSTEM

(71) Applicant: MINIMAX GMBH & CO. KG, Bad Oldesloe (DE)

(72) Inventors: Jan Felberg, Lübeck (DE); Wolfgang Habitzl, Neumitterndorf (AT)

(73) Assignee: Minimax GmbH, Bad Oldesloe (DE)

( * ) Notice: Subject to any disclaimer, the term of this patent is extended or adjusted under 35 U.S.C. 154(b) by 323 days.

(21) Appl. No.: 16/607,851

(22) PCT Filed: May 2, 2018

(86) PCT No.: PCT/EP2018/061152
§ 371 (c)(1),
(2) Date: Oct. 24, 2019

(87) PCT Pub. No.: WO2018/202682
PCT Pub. Date: Nov. 8, 2018

(65) Prior Publication Data
US 2020/0188715 A1  Jun. 18, 2020

(30) Foreign Application Priority Data

May 2, 2017 (DE) ...................... 10 2017 109 366.4

(51) Int. Cl.
| | |
|---|---|
| *A62C 35/68* | (2006.01) |
| *F16L 27/04* | (2006.01) |
| *A62C 35/02* | (2006.01) |

(52) U.S. Cl.
CPC .............. *A62C 35/68* (2013.01); *A62C 35/02* (2013.01); *F16L 27/04* (2013.01)

(58) Field of Classification Search
CPC ....... A62C 35/04; A62C 35/023; A62C 35/68; F16L 27/04; F16L 27/026; F16L 27/0861–0865
See application file for complete search history.

(56) References Cited

U.S. PATENT DOCUMENTS 3,427,051 A * 2/1969 White .................. F16L 27/026
                                                       285/145.5
5,984,015 A    11/1999 Vieregge
(Continued)

FOREIGN PATENT DOCUMENTS

| CN | 1147295 A | 4/1997 |
| CN | 2887345 Y | 4/2007 |

(Continued)

OTHER PUBLICATIONS

International Searching Authority, International Search Report in German & English translation in International Appln. No. PCT/EP2018/061152, dated Jul. 26, 2018, 5 pages.

*Primary Examiner* — Tuongminh N Pham
(74) *Attorney, Agent, or Firm* — Perkins Coie LLP

(57) ABSTRACT

The invention relates to an adapter (1) for connecting an extinguishing-agent container (105) to a pipeline connection (103) of a fire-extinguishing system (100) in a fluid-conducting manner, having a first connector (5a), which is configured to be connected to a correspondingly configured connection (107) of the extinguishing-agent container (105), and a second connector (5b), which is configured to be connected to a corresponding pipeline connection (103). In particular, the adapter has a rigid pipe coupling (3) that is variable in length and extends along a longitudinal axis (L), wherein the first connector (5a) and the second connector (5b) are each attached in an articulated manner to the pipe coupling (3).

13 Claims, 5 Drawing Sheets

(56) References Cited

U.S. PATENT DOCUMENTS

| | | | |
|---|---|---|---|
| 9,145,989 B1* | 9/2015 | Van Kooten | F16L 15/02 |
| 2008/0000649 A1 | 1/2008 | Guirguis et al. | |
| 2014/0138945 A1* | 5/2014 | Ruperte Sanchez | F02C 7/00 |
| | | | 285/268 |
| 2015/0042087 A1 | 2/2015 | Howe et al. | |
| 2015/0338003 A1* | 11/2015 | Saito | F16L 27/026 |
| | | | 285/261 |

FOREIGN PATENT DOCUMENTS

| | | |
|---|---|---|
| CN | 202266774 U | 6/2012 |
| CN | 104 728 546 A | 6/2015 |
| CN | 105 202 289 A | 12/2015 |
| DE | 1 039 798 B | 9/1958 |
| DE | 34 36 002 A1 | 9/1988 |
| DE | 299 13 902 U1 | 5/2000 |
| DE | 696 22 687 T2 | 4/2003 |
| DE | 10 2012 216 837 A1 | 3/2014 |
| DE | 20 2014 104 815 U1 | 12/2014 |
| DE | 10 2014 203 398 A1 | 8/2015 |
| EP | 2 835 567 A1 | 2/2015 |
| FR | 2 887 608 A1 | 12/2006 |
| KR | 200 460 709 Y1 | 6/2012 |
| WO | WO 2011/031722 A1 | 3/2011 |
| WO | WO 2012/081 757 A1 | 6/2012 |

* cited by examiner

CONNECTION ADAPTER FOR A CONTAINER FOR A FIRE-EXTINGUISHING AGENT PERTAINING TO A FIRE-EXTINGUISHING SYSTEM

PRIORITY CLAIM AND INCORPORATION BY REFERENCE

This application is a 35 U.S.C. § 371 application of International Application No. PCT/EP2018/061152, filed May 20, 2018, which claims the benefit of German Application No. 10 2017 109 366.4, filed May 2, 2017, each of which is incorporated by reference in its entirety.

TECHNICAL FIELD

The present invention relates to an adapter for connecting an extinguishing-agent container to a pipeline connection of a fire-extinguishing system in a fluid-conducting manner, having a first connector, which is configured to be connected to a correspondingly configured connector of the extinguishing-agent container, and a second connector, which is configured to be connected to a corresponding pipeline connector.

BACKGROUND AND SUMMARY OF THE INVENTION

Connecting extinguishing-agent containers to pipeline networks of fire-extinguishing systems has in practice hitherto consistently been faced with structural challenges. Most frequently, there has been a need for adaptation when an extinguishing-agent container for a fire-extinguishing system has been delivered and installed only subsequently, after the pipeline network has already been installed permanently at the property.

This was remedied in the past by adapting the pipeline network structurally after the placement of the extinguishing-agent container, this requiring complicated additional pipework and further fittings. The associated costs and construction effort were considered disadvantageous.

Attempts have also been made to adapt the position of the extinguishing-agent container to the existing pipeline network by underlaying spacers, for example wooden wedges etc., this entailing a great deal of installation effort and time, which is likewise considered to be disadvantageous.

In a further workaround, an adapter in the form of a flexible hose was used between the extinguishing-agent container and the pipeline network. Although this allows angular compensation in addition to (limited) height compensation between the pipeline connection, for the one part, and the connection of the extinguishing-agent container, for the other part, it is expensive to acquire and has only limited durability (generally ten years).

Other solutions use a connecting piece where two cylindrical pipes are arranged so as to be movable one in the other. However, this solution has the drawback that, when pressure is applied, it acts as a hydraulic piston and forces of up to several metric tons act on the pipeline network and the fastenings thereof, this generally resulting in damage or failure of the pipeline network fastenings and entailing expensive corrective work.

Accordingly, it was an object of the invention to create a connection possibility for connecting extinguishing-agent containers to pipeline networks of fire-extinguishing systems, which overcomes the drawbacks set out above as far as possible. In particular, it was an object of the invention to specify an adapter that, with reduced installation effort, allows angular and length compensation between the extinguishing-agent container and the pipeline network with long durability.

The invention achieves the underlying object by proposing an adapter that has a rigid pipe coupling that is variable in length and extends along a longitudinal axis, wherein the first connector and the second connector are each attached in an articulated manner to the pipe coupling. The advantage of the combination of an inherently rigid pipe coupling with two articulated connections connected preferably to the ends of the pipe coupling is considered to be that the compensation possibility as regards the angular offset between the extinguishing-agent container and the pipeline connection can be improved without having to accept the drawbacks, in particular low durability, of a flexible hose. No additional fittings or orienting work is necessary, as long as the connection of the extinguishing-agent container lies approximately at the right height.

In an advantageous development, the pipe coupling has a first connecting pipe and a second connecting pipe, which are movable relative to one another in the direction of the longitudinal axis. As a result of the length adjustability of the two connecting pipes relative one another, the possibility of compensating for unexpected height differences is also ensured.

In a preferred embodiment, the first and second connecting pipes are in threated engagement. Particularly preferably, the first and second connecting pipes in this case engage are another by means of a trapezoidal thread. A particular advantage of the trapezoidal thread is the very stable configuration of the flanks, which allow a high level of force absorption, with the result that applying pressure that does not impact the pipe network fixation. Furthermore, a very flexible choice of thread pitch of the trapezoidal thread is possible. For example, through the choice of a high pitch, with just a few revolutions, the relevant height differences can be compensated in a time- and cost-efficient manner by setting the length of the pipe coupling.

Preferably, the first connecting pipe has an external thread and the second connecting pipe has an internal thread. The two threads engage one another so as to provide length adjustability of the pipe coupling in the direction of the longitudinal axis. The internal thread is preferably formed on a threaded insert that is fastened to the second connecting pipe, for example by means of screwing, in particular in the opposite direction to the thread pitch of the trapezoidal thread, or by means of pressing into or onto the second connecting pipe. This also makes it possible to form the threaded insert from a different material than the connecting pipe, for example a material that is ductile relative to the pipe, while the pipe itself is formed from a material that is stiffer compared to the threaded insert.

By means of the connecting pipes, the pipe coupling is preferably variable in length over a length range of 20 mm or more, particularly preferably 50 mm or more. In a particularly preferred configuration, the pipe coupling is variable in length in a range from 55 mm to 105 mm in the direction of the longitudinal axis. While, in principle, the size of the range of variability depends only on the length of the individual pipes of the pipe coupling and the length of the threaded portion in the direction of the longitudinal axis, it has been found that, in practice, a range in the order of between 55 and 105 mm achieves an optimum compromise between compactness of the component and versatility of the insert. The manufacturing tolerances of the system components can be compensated with respect to one another, and in addition sufficient adjustability is available for mounting on the pipeline connection of the fire-extinguishing system, where the extinguishing-agent valve can additionally also be attached. Consideration is given here to the fact that the connection of the pipe coupling may be screwed into the extinguishing-agent valve, and the necessary "screw height" can likewise be compensated by the adjustment path of the pipe coupling.

The first and/or second connector of the pipe coupling are preferably each coupled to the pipe coupling by means of a spherical-cap joint. The spherical-cap joint has preferably a continuous flow duct for the passage of fluid, such that pressurized extinguishing agent from the extinguishing-agent container can pass into the pipe coupling through the first connector and can pass out of the adapter and into the pipeline connection of the fire-extinguishing system, or into an extinguishing-agent valve connected upstream of the latter, for example a backflow preventer, through the second connector.

Further preferably, the spherical-cap joint has a housing with a first sliding surface, and a rocking piece with a second sliding surface, wherein the first and second sliding surfaces slide against one another and are shaped such that the rocking piece is guided in a spherically movable manner in the housing. A movement guided in a spherically movable manner is understood as meaning that the rocking piece has three degrees of rotational freedom. Other examples of joint connections that are guided in a spherically movable manner are universal joints or ball joints. The rocking piece can execute a rocking movement, i.e. roll, pitch and yaw (RPY), relative to the housing of the spherical-cap joint.

The connections of the pipe coupling are preferably formed on the respective rocking piece or the housing of the spherical-cap joint, such that the rocking pieces or housings are freely movable relative to the longitudinal axis of the pipe coupling within a predefined cone volume.

In a preferred configuration, of the spherical-cap joint, at least one of the first and second sliding surfaces is configured partially or entirely in the form of a spherical segment.

Further preferably, the spherical-cap joint has, for instance on an insert let into the housing, a third sliding surface, which is arranged opposite the first sliding surface, and the rocking piece also has a fourth sliding surface, which is arranged opposite the third sliding surface, wherein the third and fourth sliding surfaces slide against one another, and are preferably shaped such that the rocking piece is guided in a spherically movable manner in the housing, wherein, further preferably, at least one of the third and fourth sliding surfaces is configured at least partially in the form of a spherical segment. The rocking piece is thus guided between the first and third sliding surfaces, thereby eliminating degrees of freedom of movement in translation.

In a preferred further configuration, a sealing element, which seals off the spherical-cap joint with respect to fluid escape to the outside, is provided between the first and second, and/or optionally the third and fourth sliding surfaces.

In a further preferred embodiment, the spherical-cap joint has an adjusting cone with an opening angle of 5° or more. Preferably, the opening angle is in a range from 5° to 20°. An opening angle of 5° defines a maximum level of angular compensation of 2.5° when the two connections of the pipe coupling are oriented in parallel, for example vertically. An opening angle of 10° defines a maximum possible level of angular compensation of 5° under the same conditions, and an opening cone of 20° would allow a level of angular compensation of up to 10° under the same conditions. The preferred range represents an optimum compromise between overall height of the spherical-cap joint and range of application of the adapter in practice.

In a further preferred embodiment, the spherical-cap joint has a pretensioning element, which is coupled to the rocking piece on one side and the housing on the other side, and preferably acts on the rocking piece in such a way as to return the latter into a central position, in which the connection provided on the rocking piece is oriented in the direction of the longitudinal axis of the pipe coupling. When the pretensioning element is pretensioned in the direction of the first and second sliding surfaces, the first and second sliding surfaces are pressed together in a fluidtight manner regardless of the angular position of the spherical-cap joint. Furthermore, the pretensioning element is configured to absorb and cushion vibrations, preferably in a damped manner. This prevents the connection adapter from detaching undesirably or suffering a fatigue fracture.

The pretensioning element preferably has a first end-side front ring and a second end-side front ring and one or more spring elements arranged between the two front rings in a manner encircling in a wavy manner. Optionally, the wave spring has one or more intermediate rings between the wavy spring elements. The pretensioning element consists of an elastically deformable material, for example spring steel or an elastomeric plastic, and has the advantage that, on account of the arrangement of the spring elements in wavy layers, it takes up extremely little axial installation space and at the same time is highly wear-resistant. When the wave spring is inserted into the housing between the first and third sliding surfaces, in the event of an angular deflection of the rocking piece relative to the housing, only ever one side of the spring is compressed, while the other side can expand for compensation.

In a further preferred embodiment, one of the two pipes of the pipe coupling is an internal pipe, and the other of the two pipes is an external pipe, wherein the internal pipe has a sliding portion that is arranged preferably on the front side and bears in a slidable manner against an inner wall of the external pipe. The sliding portion supports the internal pipe against the external pipe and prevents the two pipes tipping against one another.

Further preferably, a sealing element for sealing off the pipe coupling against fluid egress is arranged between the internal pipe and the external pipe, particularly preferably at the sliding portion. The sliding portion is preferably screwed or pressed onto the internal pipe.

The above-described embodiment of an adapter with a pretensioning element is at the same time a separate aspect of the invention. In that aspect, the invention relates to an adapter of the type indicated at the beginning, which achieves the object indicated at the beginning by suggesting an adapter for connecting an extinguishing-agent container to a pipeline connection of a fire-extinguishing system in a fluid-conducting manner, having a first connector, which is configured to be connected to a correspondingly formed connector of the extinguishing-agent container, and a second connector, which is configured to be connected to a corresponding pipeline connector, wherein at least one of the first or second connectors are each coupled to the pipe coupling by means of a spherical-cap joint, wherein the spherical-cap joint has a housing with a first sliding surface, and a rocking piece with a second sliding surface, wherein the first and second sliding surfaces slide against one another and are shaped such that the rocking piece is guided in a spherically movable manner in the housing, and wherein the spherical-cap joint has a pretensioning element, which is coupled to the rocking piece on one side and the housing on the other side, and is pretensioned in the direction of the first and second sliding surfaces such that the first and second sliding surfaces are pressed together in a fluidtight manner. The invention exploits the advantages explained above, and so reference is made in this regard to the above description. The invention has preferably one, some or all of the preferred embodiments of the adapter according to the invention that are described above and below.

Thus far, the invention has been described with reference to the adapter according to the invention in a first and a second aspect. In a further aspect, the invention also relates to a fire-extinguishing system having an extinguishing-agent container with a connector, and a pipeline connector, wherein the connector of the extinguishing-agent container and the pipeline connector are spaced apart from one another.

The invention achieves the underlying object in the case of a fire-extinguishing system indicated above in that an adapter is suggested, which connects the extinguishing-agent container to the pipeline connection in a fluid-conducting manner, wherein the adapter is configured preferably according to one of the above-described preferred embodiments. In particular, the adapter has a first connector, which corresponds to the connection of the extinguishing-agent container and is connected thereto, a second connector, which corresponds to the pipeline connection and is connected thereto, and a rigid pipe coupling that is variable in length and extends along a longitudinal axis, wherein the first connector and the second connector are each fastened in an articulated manner to the pipe coupling. With regard to the advantages and preferred embodiments of the fire-extinguishing system according to the invention, reference is made to the above explanations relating to the adapter according to the invention.

In a further aspect, the invention relates to the use of an adapter for connecting an extinguishing-agent container to a pipeline connection of a fire-extinguishing system in a fluid-conducting manner. According to the invention, the adapter is configured according to one of the above-described preferred embodiments.

BRIEF DESCRIPTION OF THE DRAWINGS

In the following text, the invention is explained in more detail on the basis of a preferred exemplary embodiment with reference to the appended figures, in which.

MODE(S) FOR CARRYING OUT THE INVENTION

Figure 1:
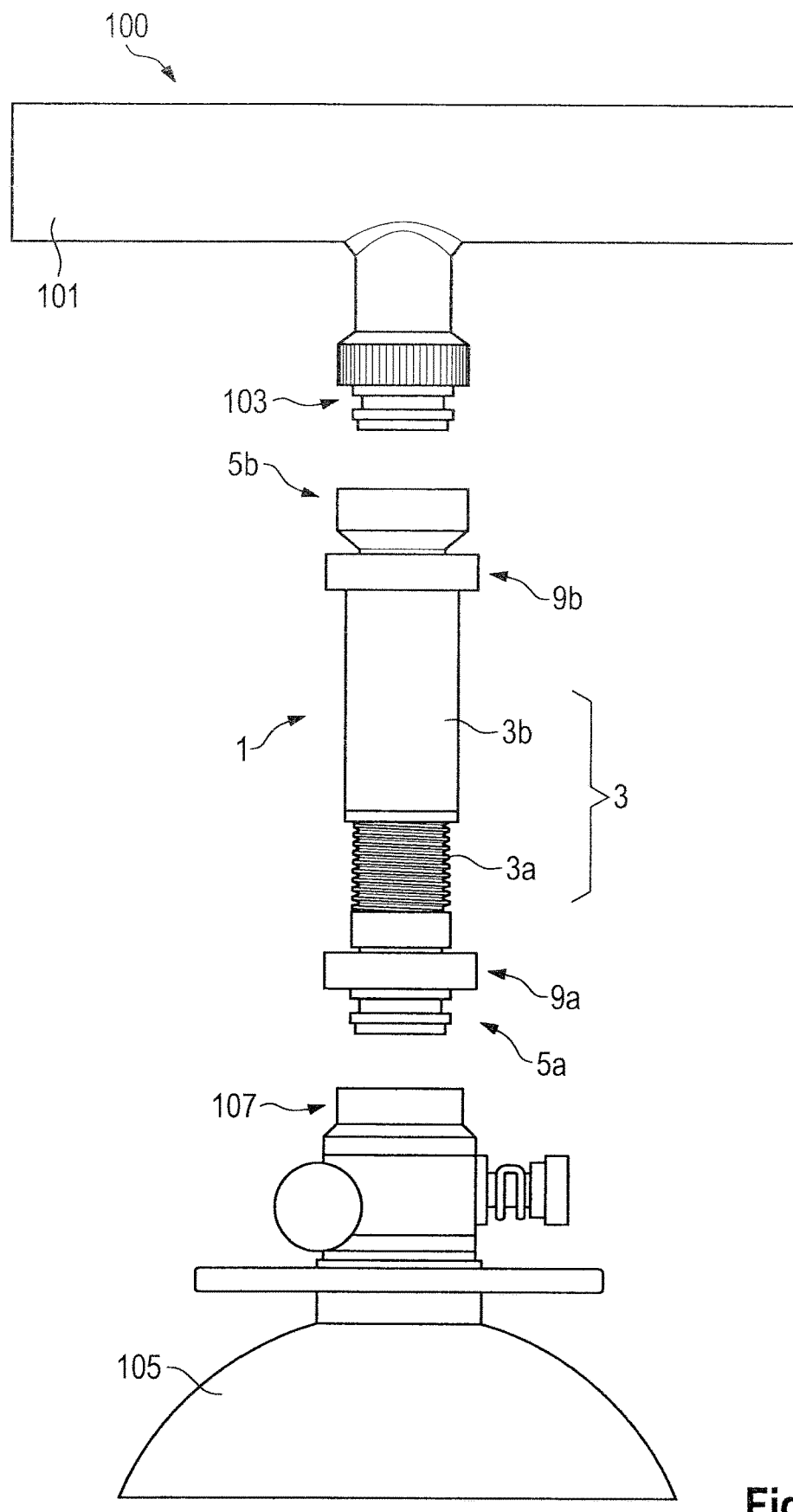
FIG. 1 shows a schematic side view of a fire-extinguishing system according to a preferred exemplary embodiment in an exploded view, FIGS. 2a,b show schematic side and cross-sectional views of an adapter for the fire-extinguishing system according to FIG. 1.

FIG. 1 illustrates a fire-extinguishing system 100. The fire-extinguishing system 100 has a pipeline network 101, which has a pipeline connector 103 for supplying extinguishing agent. The extinguishing system 100 also has an extinguishing-agent container 105, which preferably stores pressurized extinguishing agent and has a connector 107, via which extinguishing agent for the pipeline network 101 can be made available. The connector 107 of the extinguishing-agent container 105 and the pipeline connector 103 of the pipeline system 101 are connected in a fluid-conducting manner by means of an adapter 1 according to the present invention. The adapter 1 has a pipe coupling 3, which has a first pipe 3a and a second pipe 3b.

The adapter 1 has a first connector 5a, which is configured to be coupled to the connection 107 of the extinguishing-agent container 105, for example by means of a slip-on. Furthermore, the adapter 1 has a second connector 5b, which is configured to be coupled to the pipeline connection 103, for example likewise by means of a slip-on.

Further details about the structure of the adapter 1 will become apparent from the following figures.

Figure 2A:
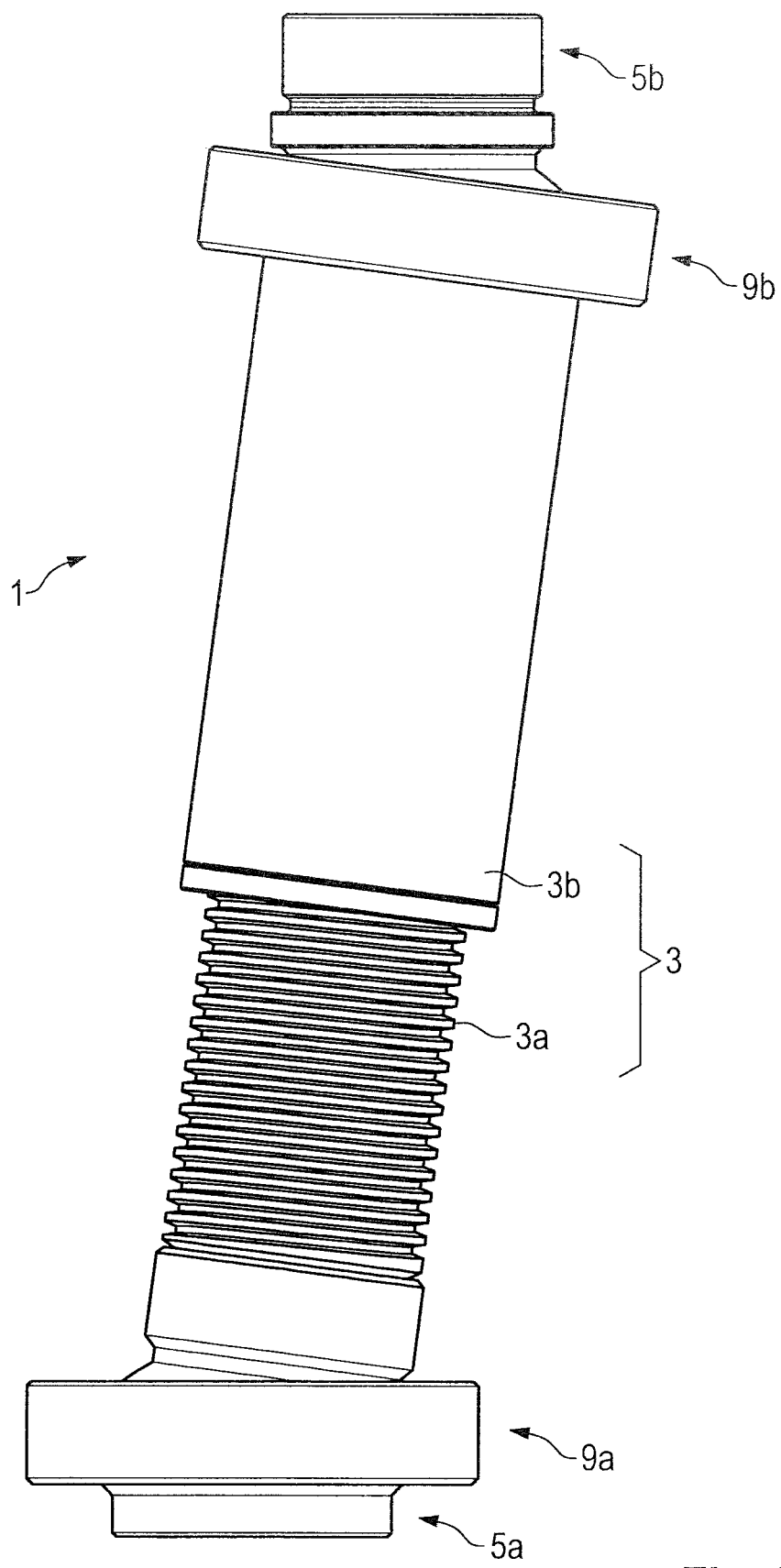

FIGS. 2a and b first of all illustrate a first preferred exemplary embodiment of the adapter 1. The adapter 1 has a first and a second spherical-cap bearing 9a,b, by means of which the respective connections 5a,b are coupled to the pipe coupling 3. The spherical-cap bearing 9a,b serves for articulated connection such that the pipe connections 5a,b can execute a guided spherical movement, i.e. a movement along a virtual sphere surface. The spherical-cap joints 9a,b each have a housing 11a,b. In the case of the first spherical-cap joint 9a, the first connector 5a of the pipe coupling 3 is formed on the housing 12a of the first spherical-cap joint 9a. The first spherical-cap joint 9a also has a rocking piece 11a, which is connected to the first pipe 3a of the pipe coupling 3.

The second spherical-cap joint 9b has a housing 12b, which is connected to the second pipe 3b of the pipe coupling 3, and a rocking piece 11b, which has the second connector of the adapter 1. Each housing 12a,b has a first sliding surface 13 and a third sliding surface 17, wherein the second sliding surface 17 is formed on an insert 21 that is inserted into the housing. Each rocking piece 11a,b has a second and a fourth sliding surface 15, 19, which are each in abutment with the associated first and third sliding surface 13, 17, with the result that the rocking piece is guided in a spherically movable manner relative to the pipe coupling 3. The rocking piece 11a,b can be moved in a rolling/rocking, yawing and pitching manner in each case within an opening cone α, wherein the neutral position is defined as the position in which the connections 5a,b are oriented in the direction of the longitudinal axis L of the pipe coupling 3.

Provided between at least one of the pairs of sliding surfaces 13/15 and 17/19 is a sealing element 23, which seals the pipe coupling 3 or the adapter 1 off with respect to fluid escape. In the embodiment shown according to FIG. 2b, the sealing element 23 is formed between the sliding surfaces 17 and 19.

The first pipe 3a of the pipe coupling 3 has an external thread 7 in the form of a trapezoidal thread. Engaged therewith is an internal thread, which is formed on the second pipe 3b of the pipe coupling 3. In this way, the pipe coupling is variable in length. In the present case, the internal thread is formed on a threaded insert 25, which is inserted, for example screwed, into the second pipe 3b. The first pipe 3a is defined as an internal pipe of the pipe coupling 3, while the second pipe 3b is defined as an external pipe. Formed on the internal pipe 3a is a sliding portion, which is in the form of a sliding sleeve 27 mounted on the front end of the pipe 3a. Provided between the sliding portion 27, which bears, substantially without play, in a slidable manner against an inner wall 28 of the second pipe 3b, and the inner wall 28 is a sealing element 29 for sealing off with respect to fluid escape.

On account of the double pairs of sliding surfaces 13/15 and 17/19, the spherical-cap joint 9a,b according to FIGS. 2a,b is subject only to a spherical movement, i.e. does not have a movement in translation component. The adapter 1' according to FIG. 3 differs slightly therefrom. Although it is based on the same operating principle of spherical-cap mounting, it has only one pair of sliding surfaces consisting of a first sliding surface 13 on the insert 21 and a second sliding surface 15 on the rocking piece 11b. A sealing element 23 seals these two sliding surfaces 13, 15 off with respect to fluid escape. The embodiment according to FIG. 3 also differs from the one according to FIG. 2b in that a pretensioning element 31 in the form of a wave spring is arranged between the housing 12 (b) and the rocking piece 11 (b), cf. also FIG. 4. The pretensioning element 31 acts to the effect that the rocking piece 11b is pressed against the insert 21. Furthermore, the pretensioning element 31 preferably acts to the effect that the rocking piece 11b is returned to a neutral position oriented on the longitudinal axis L, as soon as it has been deflected in a direction out of this neutral position. This is brought about by the pretensioning element 31 having a first and a second front ring 33, 35, which are interconnected by means of a plurality of encircling wavy annular spring elements 37, 39. If the rocking piece 11b is deflected in a direction out of the longitudinal axis L, the pretensioning element 31 is compressed in the direction of the deflection, but at the same time can expand on the diametrically opposite side, and so the rocking piece 11b stays in a defined position in abutment against the sliding surface 13 of the insert 21. Optionally, two further sliding surfaces could additionally be provided on the opposite surfaces of the rocking piece 11b and housing 12b.

Figure 3:
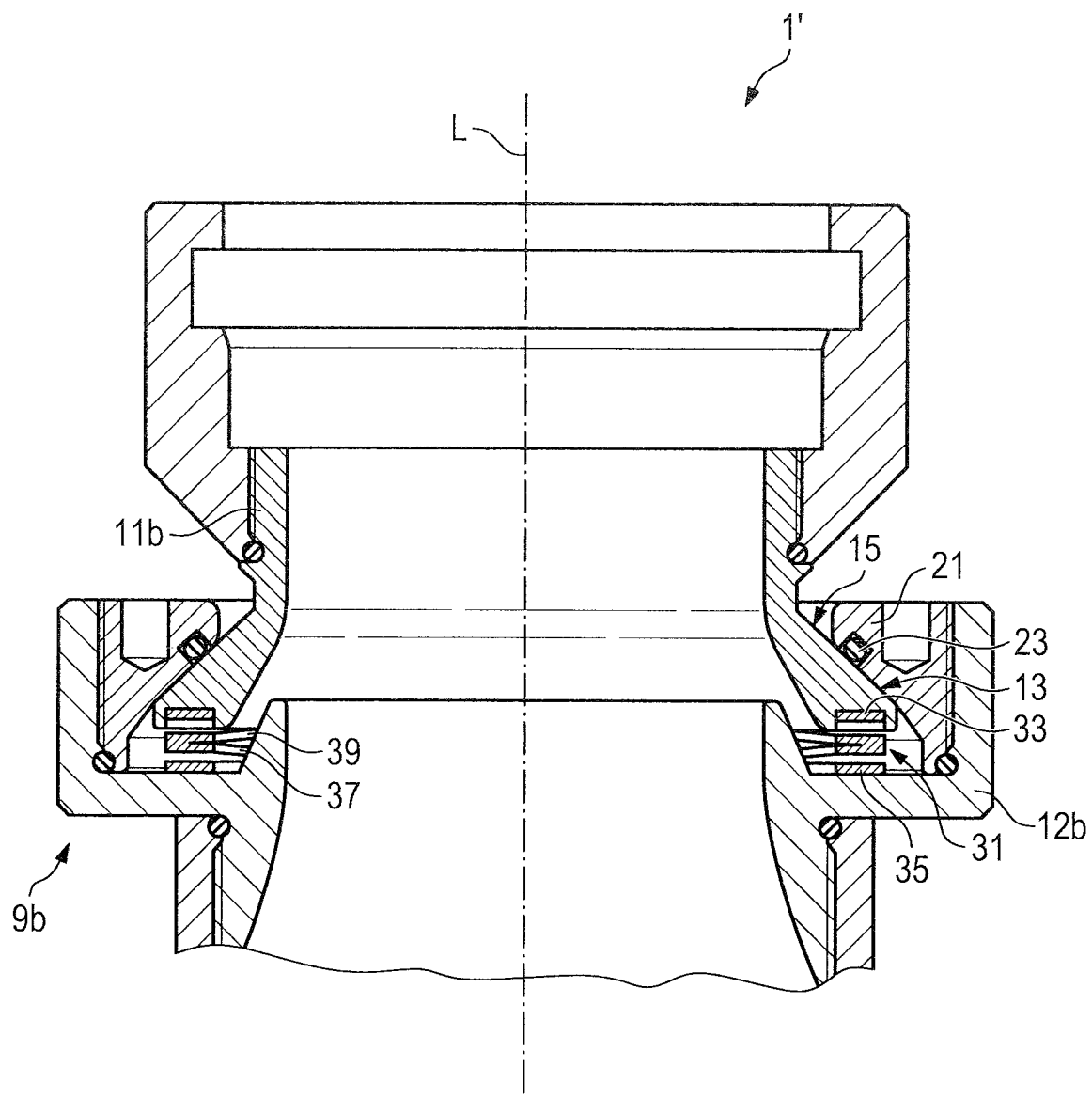
FIG. 3 shows a schematic detail view of an adapter for the fire-extinguishing system according to FIG. 1 in a further exemplary embodiment.
Figure 4:
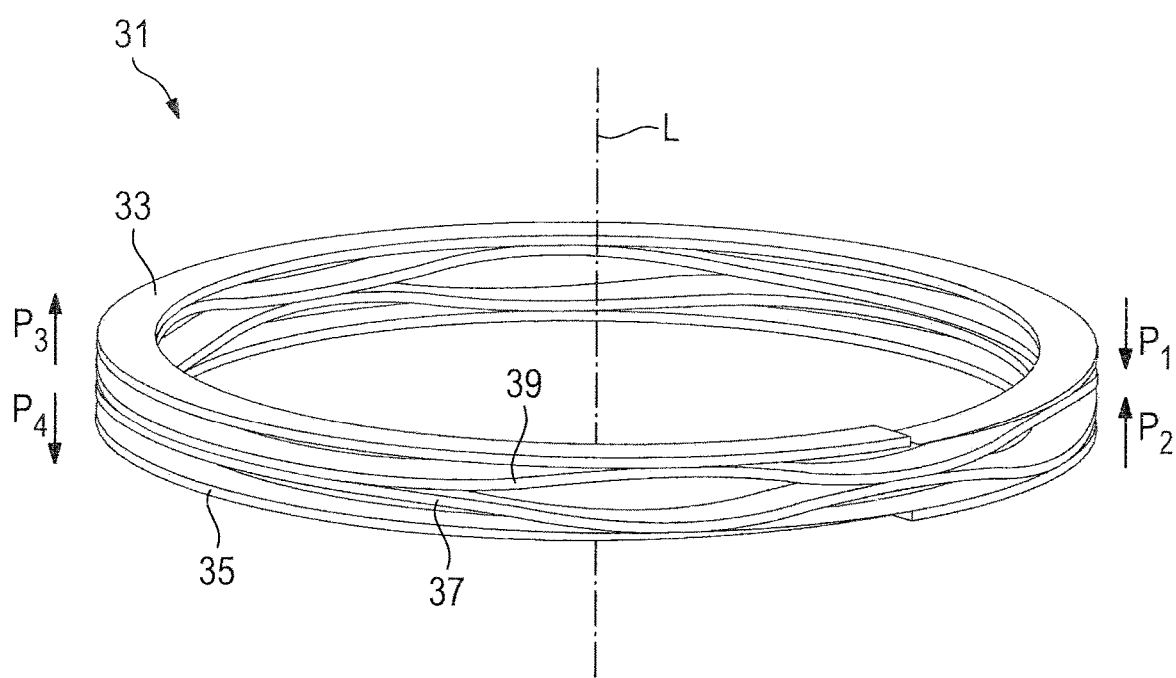
FIG. 4 shows a pretensioning element for the adapter according to FIG. 3 in a schematic three-dimensional view.

FIG. 4 indicates by way of example that, upon compression of the pretensioning element 31 on a first side in the direction of the arrows $P_1$ and $P_2$, on account of the wave geometry of the spring elements 37, 39, expansion of the pretensioning elements 31 in the direction of the arrows $P_3$, $P_4$ is brought about on a second side on the opposite side from the first side, this having the effect that, in the assembled state according to FIG. 3, a pretensioning force is always exerted on the surfaces 13, 15, regardless of the positioning angle between the rocking piece and housing.

Figure 2B:
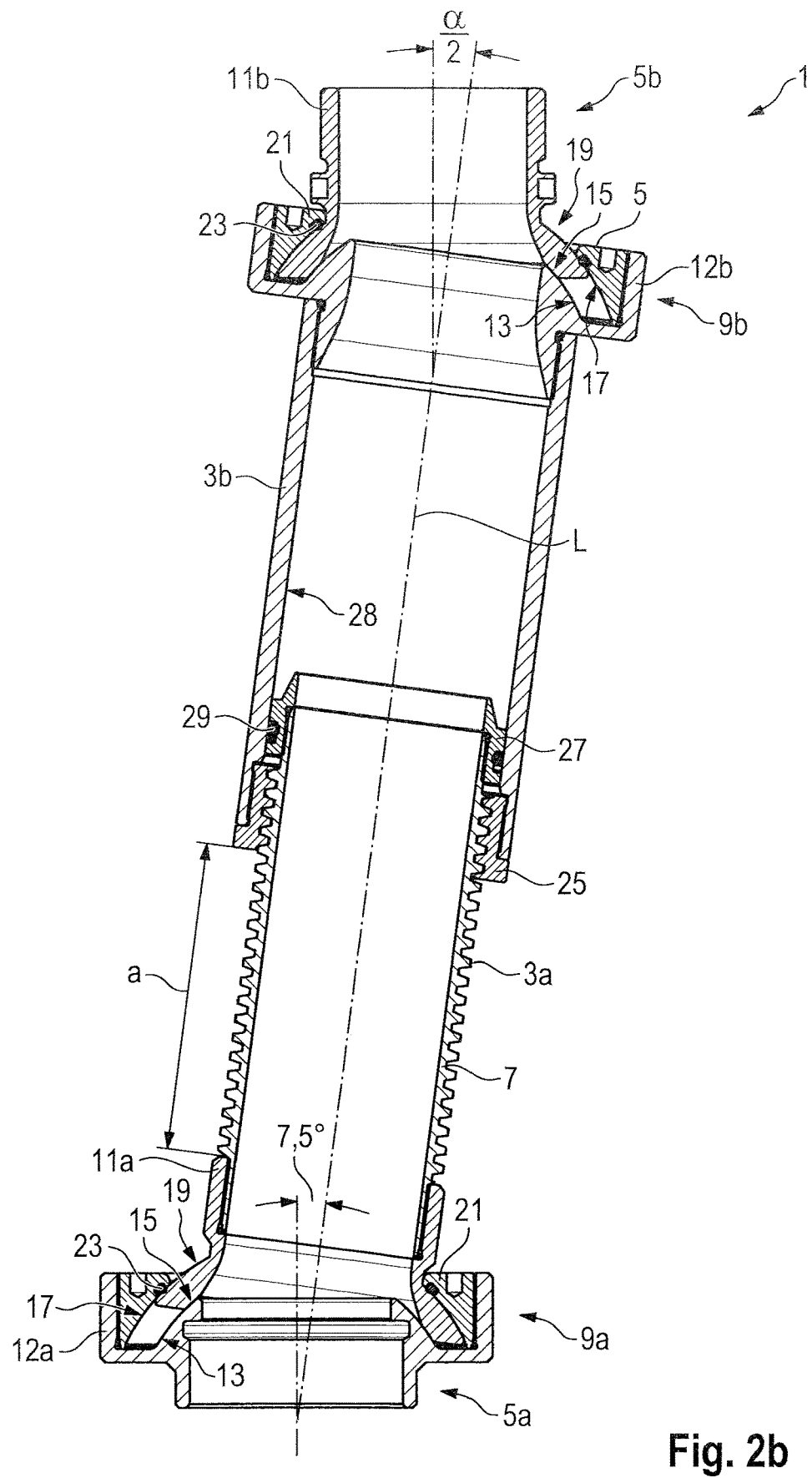

In FIG. 3, only one of the two ends of the adapter 1' is shown, wherein this should be understood as meaning that the other end of the adapter 1', analogously to FIG. 2b, can also be configured with a pretensioning element and in the same arrangement as shown in FIG. 2b, within the meaning of the invention.

LIST OF UTILIZED REFERENCE NUMBERS 1, 1' Adapter
3 Pipe coupling
3a,b Connecting pipe
5a,b Connector of the adapter
7 External thread
9a,b Spherical-cap joint
11a,b Rocking piece
12a,b Housing
13 First sliding surface
15 Second sliding surface
17 Third sliding surface
19 Fourth sliding surface
21 Insert
23 Sealing element (spherical-cap joint)
25 Threaded insert
27 Sliding portion
28 Inner wall
29 Sealing element (pipe coupling)
31 Pretensioning element
33,35 Front ring
37,39 Spring element
100 Fire-extinguishing system
101 Pipeline
103 Pipeline connector
105 Extinguishing-agent container
107 Connector of the extinguishing-agent container
α Opening angle
L Longitudinal axis of the pipe coupling
$P_1$-$P_4$ Arrows

The invention claimed is:

1. An adapter for connecting an extinguishing-agent container to a pipeline of a fire-extinguishing system in a fluid-conducting manner, the adapter comprising:
a first connector, which is configured to be connected to a correspondingly configured connection of the extinguishing-agent container,
a second connector, which is configured to be connected to a corresponding pipeline connection of the pipeline, and
a rigid pipe coupling that is variable in length and extends along a longitudinal axis, wherein the first connector and the second connector are each attached in an articulated manner to the pipe coupling,
wherein at least one of the first connector and the second connector includes a housing and a rocking piece,
wherein a pretensioning element is disposed between the housing and the rocking piece of the at least one of the first connector and the second connector,
wherein the pretensioning element has a first front ring and a second front ring interconnected by a plurality of encircling wavy annular spring elements, the first front ring contacting the rocking piece and the second front ring contacting the housing;
wherein the pipe coupling has a first connecting pipe and a second connecting pipe, which are movable relative to one another in a direction of the longitudinal axis, wherein the first connector includes the housing and rocking piece, and wherein the first connecting pipe is coupled to the rocking piece of the first connector; and
wherein the first and second connecting pipes engage each other, wherein the second connector includes a housing and rocking piece, and wherein the second connecting pipe is coupled to the housing of the second connector.

2. An adapter for connecting an extinguishing-agent container to a pipeline of a fire-extinguishing system in a fluid-conducting manner, the adapter comprising:
a first connector, which is configured to be connected to a correspondingly configured connection of the extinguishing-agent container,
a second connector, which is configured to be connected to a corresponding pipeline connection of the pipeline, and
a rigid pipe coupling that is variable in length and extends along a longitudinal axis, wherein the first connector and the second connector are each attached in an articulated manner to the rigid pipe coupling;
wherein the rigid pipe coupling has a first connecting pipe and a second connecting pipe, which are movable relative to one another in a direction of the longitudinal axis;

wherein each of the first and second connectors is coupled, respectively, to the rigid pipe coupling by a first and a second spherical-cap joint, wherein the first spherical-cap joint includes a first housing and a first rocking piece, the first rocking piece being connected to the first connecting pipe; and wherein the second spherical-cap joint includes a second housing and a second rocking piece, the second housing being connected to the second connecting pipe.

3. The adapter as claimed in claim 2, wherein the first and second connecting pipes are screwed together by a trapezoidal thread.

4. The adapter as claimed in claim 2, wherein the pipe coupling is variable in length in the direction of the longitudinal axis over a length range of 20 mm to 105 mm.

5. The adapter as claimed in claim 2, wherein each of the first and second spherical-cap joint has a continuous flow duct for a passage of fluid.

6. The adapter as claimed in claim 2, wherein the first housing has a first sliding surface, and the first rocking piece has a second sliding surface, wherein the first and second sliding surfaces slide against one another and are shaped such that the first rocking piece is guided in a spherically movable manner in the first housing.

7. The adapter as claimed in claim 6, wherein at least one of the first and second sliding surfaces is formed as a spherical segment.

8. An adapter for connecting an extinguishing-agent container to a pipeline of a fire-extinguishing system in a fluid-conducting manner, the adapter comprising:
a first connector, which is configured to be connected to a correspondingly configured connection of the extinguishing-agent container,
a second connector, which is configured to be connected to a corresponding pipeline connection of the pipeline, and
a rigid pipe coupling that is variable in length and extends along a longitudinal axis, wherein the first connector and the second connector are each attached in an articulated manner to the rigid pipe coupling;
wherein the rigid pipe coupling has a first connecting pipe and a second connecting pipe, which are movable relative to one another in a direction of the longitudinal axis,
wherein at least one of the first or second connectors is coupled to the rigid pipe coupling by a spherical-cap joint,
wherein the spherical-cap joint has a housing with a first sliding surface and a first non-sliding surface, and a rocking piece with a second sliding surface and a second non-sliding surface, wherein the first and second sliding surfaces slide against one another and are shaped such that the rocking piece is guided in a spherically movable manner in the housing,
wherein a pretensioning element is disposed between the rocking piece and the housing, and contacts the second non-sliding surface of the rocking piece, and
wherein the pretensioning element is pretensioned in a direction of the first and second sliding surfaces such that the first and second sliding surfaces are pressed together in a fluidtight manner.

9. An adapter for connecting an extinguishing-agent container to a pipeline of a fire-extinguishing system in a fluid-conducting manner, the adapter comprising:
a first connector, which is configured to be connected to a correspondingly configured connection of the extinguishing-agent container,
a second connector, which is configured to be connected to a corresponding pipeline connection of the pipeline, and
a rigid pipe coupling that is variable in length and extends along a longitudinal axis, wherein the first connector and the second connector are each attached in an articulated manner to the rigid pipe coupling;
wherein the rigid pipe coupling has a first connecting pipe and a second connecting pipe, which are movable relative to one another in a direction of the longitudinal axis,
wherein at least one of the first or second connectors is coupled to the pipe coupling by a spherical-cap joint,
wherein the spherical-cap joint has a housing with a first sliding surface, and a rocking piece with a second sliding surface, wherein the first and second sliding surfaces slide against one another to provide a first pair of sliding surfaces and are shaped such that the rocking piece is guided in a spherically movable manner in the housing,
wherein the spherical-cap joint has a third sliding surface on an insert, which is arranged opposite the first sliding surface, and the rocking piece has a fourth sliding surface, which is arranged opposite the third sliding surface, wherein the third and fourth sliding surfaces slide against one another to provide a second pair of sliding surfaces and are shaped such that the rocking piece is guided in a spherically movable manner in the housing, wherein, at least one of the third and fourth sliding surfaces is formed as a spherical segment, and
wherein the first pair of sliding surfaces and second pair of sliding surfaces are configured so that the second and fourth sliding surfaces are disposed between the first and third sliding surfaces.

10. The adapter as claimed in claim 2, wherein at least one of the first and second spherical-cap joint has an adjusting cone with an opening angle in a range from 5° to 20°.

11. The adapter as claimed in claim 2, wherein one of the first connecting pipe and a second connecting pipe is an internal pipe, and the other of the first connecting pipe and a second connecting pipe is an external pipe, and wherein the internal pipe has a sliding portion that is arranged on a front side and bears in a slidable manner against an inner wall of the external pipe.

12. The adapter as claimed in claim 11, wherein a sealing element for sealing off the pipe coupling against fluid egress is arranged between the internal pipe and the external pipe at the sliding portion.

13. A fire-extinguishing system comprising:
an extinguishing-agent container with a connection,
a pipeline connection, wherein the connection of the extinguishing-agent container and the pipeline connection are spaced apart from one another, and
an adapter, which connects the extinguishing-agent container to the pipeline connection in a fluid-conducting manner, wherein the adapter has a first connector, which corresponds to the connection of the extinguishing-agent container and is connected thereto, a second connector, which corresponds to the pipeline connection and is connected thereto, and a rigid pipe coupling that is variable in length and extends along a longitudinal axis, wherein the first connector and the second connector are each attached in an articulated manner to the pipe coupling, wherein the rigid pipe coupling has a first connecting pipe and a second connecting pipe, which are movable relative to one another in a direction of the longitudinal axis;

wherein each of the first and second connectors is coupled, respectively, to the rigid pipe coupling by a first and a second spherical-cap joint, wherein the first spherical-cap joint includes a first housing and a first rocking piece, the first rocking piece being connected to the first connecting pipe; and wherein the second spherical-cap joint includes a second housing and a second rocking piece, the second housing being connected to the second connecting pipe.

\* \* \* \* \*